(12) United States Patent
Depreter

(10) Patent No.: US 9,020,624 B2
(45) Date of Patent: Apr. 28, 2015

(54) METHOD AND SYSTEM FOR MANAGING RESULTS OF AN ANALYSIS PROCESS ON OBJECTS HANDLED ALONG A TECHNICAL PROCESS LINE

(75) Inventor: Frédéric Depreter, Le Roeulx (BE)

(73) Assignee: Siemens Aktiengesellschaft, Munich (DE)

( * ) Notice: Subject to any disclaimer, the term of this patent is extended or adjusted under 35 U.S.C. 154(b) by 866 days.

(21) Appl. No.: 12/625,748

(22) Filed: Nov. 25, 2009

(65) Prior Publication Data

US 2010/0161097 A1 Jun. 24, 2010

(30) Foreign Application Priority Data

Dec. 18, 2008 (EP) ..................................... 08172127

(51) Int. Cl.
- G06F 19/00 (2011.01)
- G06Q 10/00 (2012.01)
- G06F 7/00 (2006.01)
- G06Q 10/06 (2012.01)

(52) U.S. Cl.
CPC ....................................... G06Q 10/06 (2013.01)

(58) Field of Classification Search
CPC ....................................................... G06Q 10/06
USPC .................. 700/100, 116; 707/608; 705/7.13
See application file for complete search history.

(56) References Cited

U.S. PATENT DOCUMENTS

| | | | |
|---|---|---|---|
| 4,562,843 A * | 1/1986 | Djordjevich et al. .......... | 600/485 |
| 4,735,777 A * | 4/1988 | Mitsui et al. .................... | 422/70 |
| 5,231,567 A * | 7/1993 | Matoba et al. ................. | 700/100 |
| 5,301,320 A * | 4/1994 | McAtee et al. ............... | 705/7.13 |
| 5,774,661 A * | 6/1998 | Chatterjee et al. ............ | 709/203 |
| 5,817,032 A * | 10/1998 | Williamson et al. .......... | 600/562 |
| 5,893,906 A * | 4/1999 | Daffin et al. .................... | 705/28 |

(Continued)

FOREIGN PATENT DOCUMENTS

CN 101276308 A 10/2008

OTHER PUBLICATIONS

PCS 7/ Simantic IT Using Simantic IT to Integrate MES Functionality in PCS 7, Siemens Manual, 2005, 142 pages.*

(Continued)

*Primary Examiner* — Robert Fennema
*Assistant Examiner* — Thomas Stevens
(74) *Attorney, Agent, or Firm* — Laurence A. Greenberg; Werner H. Stemer; Ralph E. Locher

(57) ABSTRACT

A system manages results of an analysis process on objects handled along a technical process line. The system contains measures for defining workflow steps of the technical process line and workflow execution software, and measures for generating for each object an object record containing the results of the workflow steps and a status. The system further has measures for defining an event manager for managing a transition from an actual status to a new status according to results of the workflow steps. The event manager contains a customized number of statuses linked to the workflow steps and contains for each transition a customizable set of rules for delivering check results. Finally, measures are provided for executing in parallel the analysis process, the workflow execution software and the event manager, thereby assigning a status to the object record depending on the check results derived from the execution of the set of rules.

15 Claims, 4 Drawing Sheets

(56) References Cited

U.S. PATENT DOCUMENTS

| | | | |
|---|---|---|---|
| 6,115,646 A * | 9/2000 | Fiszman et al. | 700/181 |
| 6,341,287 B1 * | 1/2002 | Sziklai et al. | 1/1 |
| 6,349,238 B1 * | 2/2002 | Gabbita et al. | 700/101 |
| 6,353,471 B1 * | 3/2002 | Samsoondar et al. | 356/40 |
| 6,594,588 B1 * | 7/2003 | Peden et al. | 702/32 |
| 6,823,708 B1 * | 11/2004 | Okubo | 72/420 |
| 6,826,579 B1 | 11/2004 | Leymann et al. | |
| 6,884,578 B2 * | 4/2005 | Warrington et al. | 435/6.14 |
| 7,054,823 B1 * | 5/2006 | Briegs et al. | 705/2 |
| 7,233,405 B2 * | 6/2007 | Fromherz | 358/1.13 |
| 7,269,925 B2 * | 9/2007 | Lam | 52/79.1 |
| 7,275,039 B2 * | 9/2007 | Setteducati | 705/7.24 |
| 7,519,589 B2 * | 4/2009 | Charnock et al. | 1/1 |
| 7,668,864 B2 * | 2/2010 | Benson et al. | 707/608 |
| 7,936,913 B2 * | 5/2011 | Nordell et al. | 382/134 |
| 8,597,899 B2 * | 12/2013 | Gough et al. | 435/7.21 |
| 2003/0004751 A1 * | 1/2003 | Ng et al. | 705/2 |
| 2003/0046114 A1 * | 3/2003 | Davies et al. | 705/3 |
| 2003/0047027 A1 * | 3/2003 | Sato | 75/228 |
| 2003/0058277 A1 * | 3/2003 | Bowman-Amuah | 345/765 |
| 2003/0149714 A1 | 8/2003 | Casati et al. | |
| 2003/0181991 A1 * | 9/2003 | Chau et al. | 700/1 |
| 2003/0216651 A1 * | 11/2003 | Burns et al. | 600/483 |
| 2004/0078216 A1 * | 4/2004 | Toto | 705/2 |
| 2004/0101189 A1 * | 5/2004 | Green et al. | 382/133 |
| 2004/0122787 A1 * | 6/2004 | Avinash et al. | 706/50 |
| 2004/0122790 A1 * | 6/2004 | Walker et al. | 707/1 |
| 2004/0162741 A1 | 8/2004 | Flaxer et al. | |
| 2004/0203037 A1 * | 10/2004 | Lo et al. | 435/6 |
| 2004/0254465 A1 * | 12/2004 | Sano et al. | 600/443 |
| 2005/0038676 A1 * | 2/2005 | Showalter et al. | 705/2 |
| 2005/0112541 A1 * | 5/2005 | Durack et al. | 435/2 |
| 2005/0176089 A1 * | 8/2005 | Ehrlich | 435/40.5 |
| 2005/0182657 A1 * | 8/2005 | Abraham-Fuchs et al. | 705/2 |
| 2005/0273272 A1 * | 12/2005 | Brando et al. | 702/19 |
| 2005/0273367 A1 * | 12/2005 | Nourie et al. | 705/3 |
| 2006/0062734 A1 * | 3/2006 | Melker et al. | 424/10.1 |
| 2006/0079809 A1 * | 4/2006 | Goldberger et al. | 600/576 |
| 2006/0100906 A1 * | 5/2006 | Sweetser | 705/2 |
| 2006/0122865 A1 * | 6/2006 | Preiss et al. | 705/2 |
| 2006/0206505 A1 * | 9/2006 | Hyder et al. | 707/100 |
| 2006/0236328 A1 * | 10/2006 | DeWitt | 719/329 |
| 2007/0112804 A1 * | 5/2007 | DeSimas et al. | 707/100 |
| 2007/0112858 A1 * | 5/2007 | Maughan et al. | 707/104.1 |
| 2007/0118399 A1 * | 5/2007 | Avinash et al. | 705/2 |
| 2007/0231909 A1 * | 10/2007 | Hunter | 436/15 |
| 2007/0282997 A1 * | 12/2007 | Trochman | 709/224 |
| 2008/0059226 A1 * | 3/2008 | Melker et al. | 705/2 |
| 2008/0134140 A1 * | 6/2008 | Weiner et al. | 717/105 |
| 2008/0177612 A1 * | 7/2008 | Starink et al. | 705/8 |
| 2008/0208750 A1 * | 8/2008 | Chen | 705/50 |
| 2008/0250427 A1 | 10/2008 | Shin | |
| 2009/0041329 A1 * | 2/2009 | Nordell et al. | 382/134 |
| 2009/0182580 A1 * | 7/2009 | Martin et al. | 705/3 |
| 2010/0049542 A1 * | 2/2010 | Benjamin et al. | 705/2 |
| 2011/0010099 A1 * | 1/2011 | Adourian et al. | 702/19 |
| 2011/0045514 A1 * | 2/2011 | Muntendam et al. | 435/15 |
| 2011/0117553 A1 * | 5/2011 | Hogan et al. | 435/6 |

OTHER PUBLICATIONS

Huang-C.Y., "Distributed Manufacturing Execution Systems: A Workflow Perspective", Dept. of Industrial Engineering and Enterprise Information, 2000, 13 pages.*

Goh A. et al: "ECA rule-based support for workflows", Artificial Intelligence in Engineering, Elsevier Applied Science Ltd., London, GB, vol. 15, Jan. 1, 2001, pp. 37-46, XP002476820.

European Search Report dated Jul. 1, 2009, 7 pages.

* cited by examiner

US 9,020,624 B2

METHOD AND SYSTEM FOR MANAGING RESULTS OF AN ANALYSIS PROCESS ON OBJECTS HANDLED ALONG A TECHNICAL PROCESS LINE

CROSS-REFERENCE TO RELATED APPLICATION

This application claims the priority, under 35 U.S.C. §119, of European application EP 08172127, filed Dec. 18, 2008; the prior application is herewith incorporated by reference in its entirety.

BACKGROUND OF THE INVENTION

Field of the Invention

The present invention relates to a method and a system for managing results of an analysis process on objects, such as samples, analysis results or sample info cards, handled along a technical process line, such as a laboratory or a production line.

As it is well known, a method for managing and controlling manufacturing and/or analysis processes planned by an Enterprise Resource Planning (ERP) and produced by a technical process line, provides in the environment of a Manufacturing Executing System (MES) an automation system for implementing the planned analysis processes and controlling the corresponding workflow steps at the level of the technical process line.

In particular, the Enterprise Resource Planning (ERP) is a system including hardware devices and corresponding software applications for planning the business resources of an enterprise, i.e. material provisions, human resource managements, purchasing, orders, profits, finance, inventory controls, customer managements, etc., while the term "technical process line" has been used to indicate a system supporting the control of single machines involved in the analysis processes, for example by measuring the number of pieces handled per hour by each machine or the functioning parameters thereof, the quality of the analysis results and so on.

MES is an intermediate layer providing computing machines and software tools between the ERP upper layer and the process line lower layer, including a software tool for analysis management, which receives requests of analysis from the ERP, and a software tool for productive process, which supports the phases of selecting and managing the resources to be involved in the productive processes, i.e. employees, machines and materials, in order to realize a planned analysis process within required time constraints.

MES is based on the International Standard Association (ISA) standard S95 which defines how software tools may implement the productive process at the plant floor level and how to communicate with it. Beside the productive process itself, it is crucial for many industries to either control the productive process in terms of analysis, measures and traceability of the products, i.e. pharmaceutical industry, food industry, high-tech industry, or for those industries where the productive process itself is a process of analyzing a sample, i.e. medical diagnostic analysis, material science analysis, drug scanning and so on.

These results of an analysis process are typically managed by software processes which are closely related to the MES software. Siemens Corporation is distributing this kind of software under its trade name "SIMATIC IT UNILAB®". This type of software is typically called a LIMS system (Laboratory Information Management System) and manages the results of the analysis and/or measures from laboratories or production lines, in particular with a determined aspect on the traceability of the sample or production results. Usually, all these results are related to a distinct sample (or lot) which is reflected in an electronic sample record corresponding to the physical sample. During the workflow along the technical process line, the electronic sample records also hold status information corresponding to the actual status of the physical sample. Typical status are for example "Arrived in Laboratory", "Ready for analysis", "Analyzed", "To be inspected by Lab Manager", "Repeat analysis" and so on.

The LIMS software is usually standard software which is used in many different types of laboratories which implies a large imminent need to customize the software. Almost in any case, the laboratory would like to:
a) define its own status;
b) define the conditions for the transition from one status to the other; and
c) define its own activities that should take place when going from one status to another.

Currently, the customization is achieved by hard-coding the status, the conditions and the transition into the standard software solution. The LIMS systems currently available offer, by this hard-coding, a flexibility to the customer residing in a fixed set of status, status transitions and conditions.

Anyway, the LIMS currently available cannot satisfy all the demands of the laboratory operator without additional hard-coding within the workflow execution software of the laboratory in order to customize the LIMS to the extent necessary which renders the LIMS expensive and any customization time-consuming.

SUMMARY OF THE INVENTION

It is accordingly an object of the invention to provide a method and a system for managing results of an analysis process on objects handled along a technical process line which overcome the above-mentioned disadvantages of the prior art methods and devices of this general type, which avoids the hard-coding in the environment of the workflow execution software.

With respect to the method, the objective is achieved according to the present invention by a method for managing results of an analysis process on objects, such as samples, analysis results or sample info cards, handled along a technical process line, such as a laboratory or a production line. The method includes the steps of:
a) defining workflow steps of the technical process line and respective workflow controlling software;
b) generating for each object an object record containing the results of the work flow steps and a respective status;
c) defining an event manager for managing a transition from an actual status to a new status according to the results of the workflow steps, the event manager being individually programmable apart from the workflow controlling software;
d) defining for the event manager a customized number of statuses linked to the workflow steps and for each transition a customizable set of rules delivering check results; and
e) executing in parallel the analysis process, its workflow execution software and the event manager, thereby assigning a status to the object record depending on the check results derived from the execution of the respective customizable set of rules.

With respect to the system, the objective is achieved according to the present invention by a system for managing results of an analysis process on objects, such as samples, analysis results or sample info cards, handled along a technical process line, such as a laboratory or a production line. The system contains:

a) measures for defining workflow steps of the technical process line and a respective workflow execution software;
b) measures for generating for each object an object record containing the results of the workflow steps and a respective status;
c) measures for defining an event manager for managing a transition from an actual status to a new status according to the results of the workflow steps, the event manager being individually programmable apart from the workflow executing software;
d) the event manager containing a customized number of statuses linked to the workflow steps and containing for each transition a customizable set of rules delivering check results; and
e) measure for executing in parallel the analysis process and its workflow execution software and the event manager, thereby assigning a status to the object record depending on the check results derived from the execution of the respective customizable set of rules.

The present method and system now allows one to customize the management of the analysis results by the event manager which is controlling the sample records in terms of its status and the information contained therein. Since the event manager can be programmed apart from the workflow execution software, the event manager is a customized life cycle manager for the object record and is called from or triggered by the workflow execution software. The event calling the event manager can be any user-defined event having a relevance to the actual status or for a transition of the actual status into the new status.

A further preferred embodiment of the present invention further contains the set of customizable rules containing a number of activities which are executed in response to the delivered check results. Therefore, the event manager is not only responsible for the determination of the status and its transition but is also customizable to the extent of activities that have to be executed when a transition of the status has occurred. Possible activities are for example the sending of an email, generating a report, printing a quality protocol and the like. Preferably, these activities then are executed and/or controlled by a separate processing line independent from the event manager and the workflow controlling software meaning that any surrounding system, such as a normal MS Office environment or the like, can operate the activities.

Very often, the actual status and the readiness for a transition of the status are related to values contained in the object record that shall range within a distinct interval. Therefore, a further preferred embodiment of the present invention provides the set of customizable rules being enabled to check the content of the object record against predefined thresholds. In particular, this checking against predefined thresholds may further comprise deciding whether an entry is present within a distinct record field of the object record or not. Just to provide a simple example: the object record corresponding to a human blood sample does not contain any entry of the quantity of elevated blood lipids, hence the event manager can not assign the status "lipid analysis performed" to the object record.

A further preferred embodiment of the present invention provides the execution of the set of customizable rules by the event manager being triggered by any modification of the object and/or of its respective object record. Every time the object is modified by a further production process or the object record receives a new entry, the event manager can be called to check whether there exist a set of customized rules and, if yes, execute these rules against the current status and/or object record.

In order to speed up the performance of the event manager, the selection of the set of customizable rules has to be improved. Therefore, a further preferred embodiment of the present invention provides the set of customizable rules being selected depending the actual status within the object record. This concept organizes the set(s) of rules being assigned to determined status.

Other features which are considered as characteristic for the invention are set forth in the appended claims.

Although the invention is illustrated and described herein as embodied in a method and a system for managing results of an analysis process on objects handled along a technical process line, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
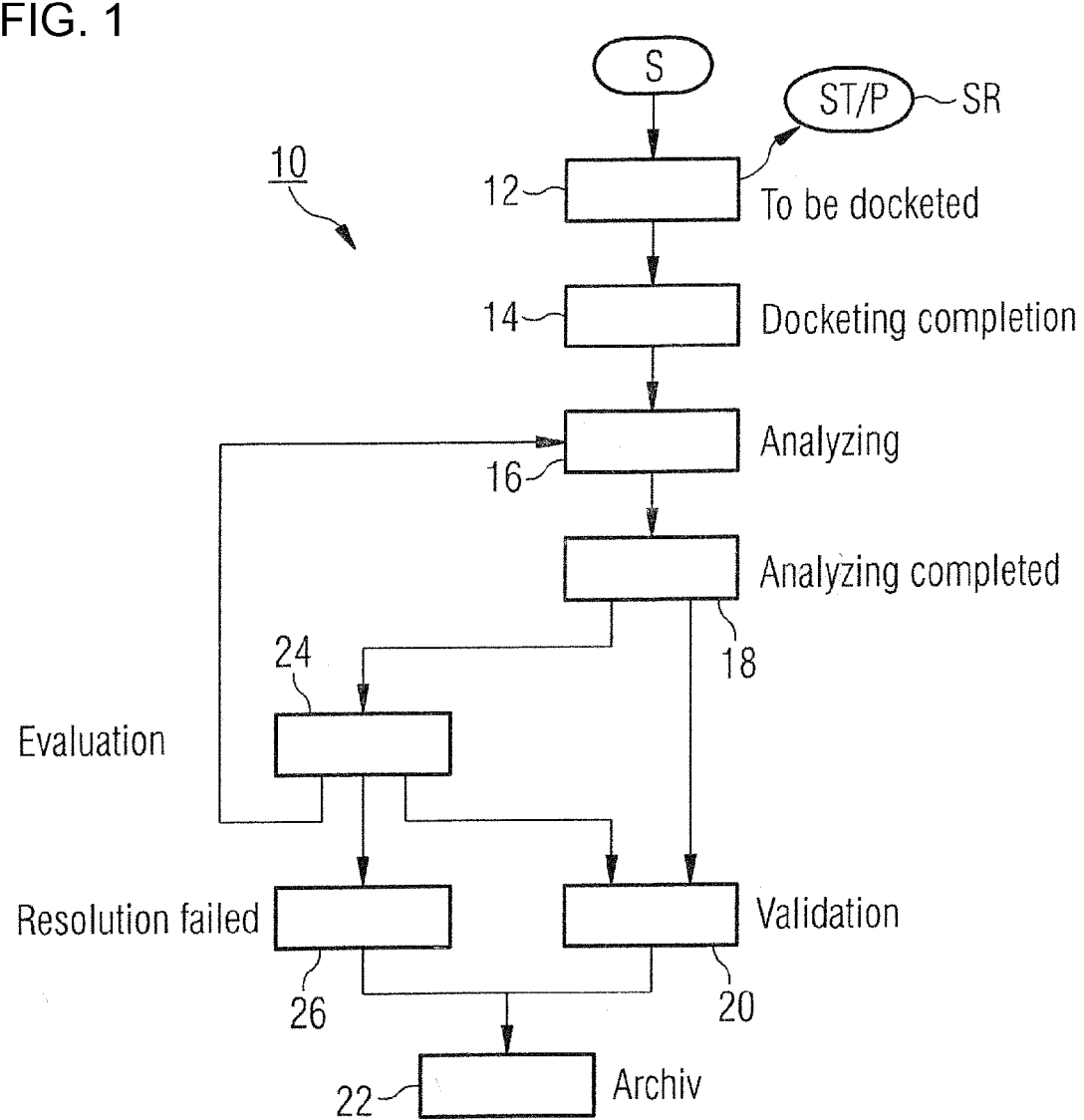
FIG. 1 is a workflow diagram for explaining a life cycle of a sample in a medical diagnostic laboratory according to the invention.

Referring now to the figures of the drawing in detail and first, particularly, to FIG. 1 thereof, there is shown a workflow 10 of a life cycle of a blood sample S in a non-illustrated medical laboratory. The workflow 10 contains a number of workflow steps 12 to 26. When entering the laboratory, the sample S is handled according to the first workflow step 12 in a docketing section. During the workflow step 12 the sample S is created in a database and a respective sample record SR is assigned to the sample S. In the next workflow step 14, the sample S is labeled and conveyed to an analysis process line. In a workflow executing software, the sample S is now marked as being prepared for analysis. In the next workflow step 16, the sample S is processed through the analysis process line (here a blood diagnosis line). In the workflow step 18 the analysis will be completed and any result available from the analysis is written to the sample record and it is decided which workflow step will be the next appropriate workflow step, either workflow step 20 or 24.

In workflow step 20 the analysis results are validated because analysis parameters P of the sample S are within a reasonable bandwidth. In case of an deviating parameter P, the sample S is in workflow step 24, and evaluated and a decision is made how to further proceed, either re-analyze in workflow step 16 or in case of a resolution to workflow step 20 or a final workflow step 26 which confirms the failure of the resolution of the parameter deviation. After both workflow steps 20, 26, in workflow step 22 the sample record and optionally the sample S itself will be archived, booking record will be generated and the results will be sent to the instructing person.

Figure 2:
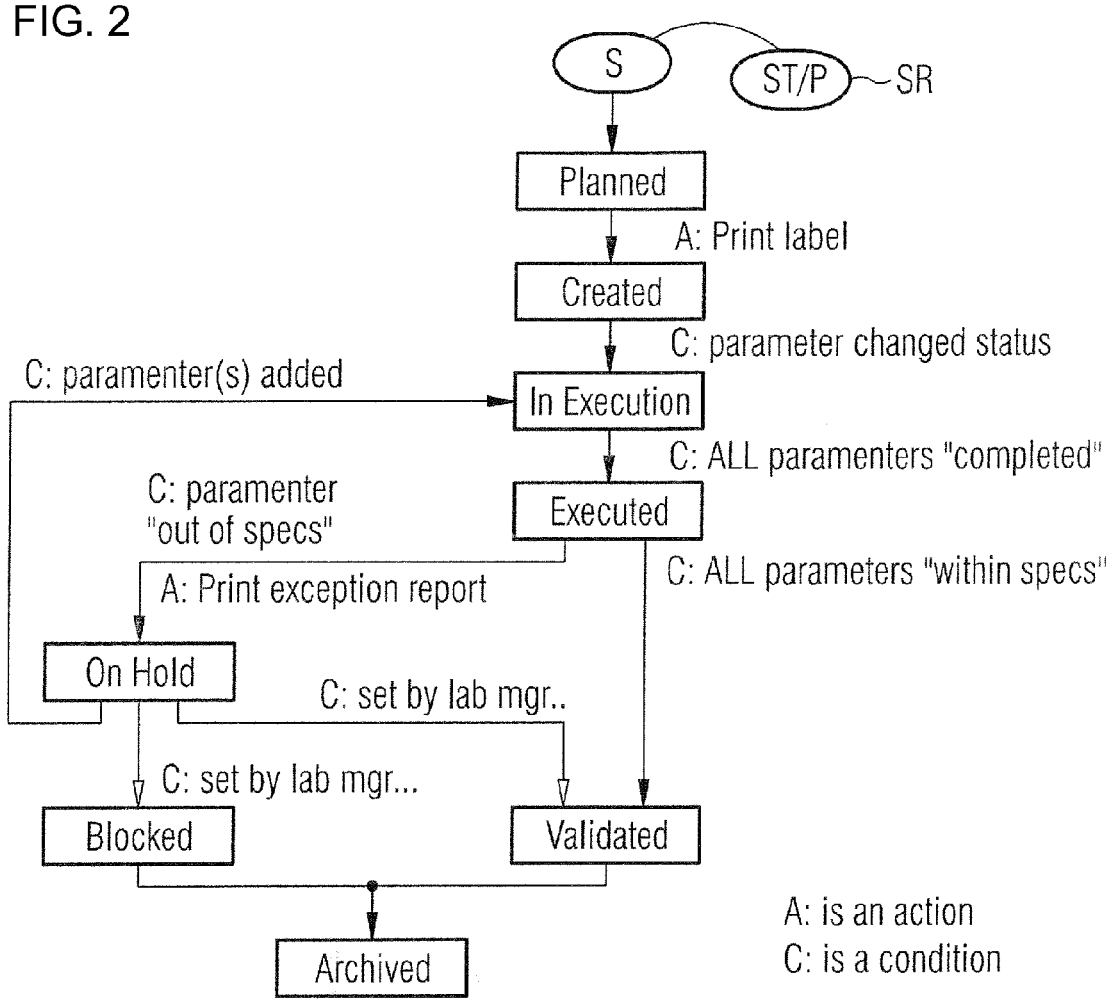
FIG. 2 is a flow diagram schematically representing statuses aligned with the workflow diagram of FIG. 1.

Accompanying to the workflow 10, FIG. 2 now schematically illustrates different statuses ST aligned with the workflow step 12 to 26. The status ST and the analysis parameter P are contained in the sample record SR. The following table illustrates the workflow step 12 to 26, the respective status ST, a condition C and an action A.

| Workflow step | Status | Condition C to go to next status ST | Action A |
|---|---|---|---|
| 12 | PLANNED | none | print label |
| 14 | CREATED | parameter changed status | none |
| 16 | IN EXECUTION | all parameter completed | none |
| 18 | EXECUTED | All parameter within specification = go to ST = VALIDATED; Parameter out of specification = go to ST = ON HOLD | none; print exception report |
| 20 | VALIDATED | | |
| 22 | ARCHIVED | | |
| 24 | ON HOLD | Set by lab manager to go to next status | |
| 26 | BLOCKED | | |

As it can be seen in the table above, for each status ST and the transition to the next status ST, a set of internal rules is defined. From PLANNED to CREATED requires for example to check whether the required fields in a docketing mask have been entered.

The workflow 10 is controlled by work flow execution software, like SIMATIC IT UNILAB®. All statuses ST, conditions C, actions A and set of rules are individually defined by a user with an event manager EM illustrated schematically in FIG. 3. The workflow execution software, hereinafter called Application, calls at (1) a process database DB API to update the entries in the sample record SR. This call is forwarded at (2) to an event queue and alerts at (3) the event manager EM that a change of data has to occur. The event manager EM reads the event at (A) from the event queue and decides how the set of rules now have to be applied in order to check the status ST in the sample record SR. The checking delivers check results (internally handled) which will answer the question whether to amend the actual status ST in the sample record SR to the next status ST are foreseen in the status progression aligning the workflow 10. The transaction here is completed when the event manager EM commits to a change to the next status. The new status ST is then sent back to the Application at (4).

Due to this structure, the complete management of the life cycle of the sample S in the laboratory is managed by the event manager EM containing the completely customizable status, sets of rules, conditions, actions and the like. Therefore, the execution of the event manager EM runs in parallel to the desired transactions according to the workflow steps 12 to 26.

Figure 4:
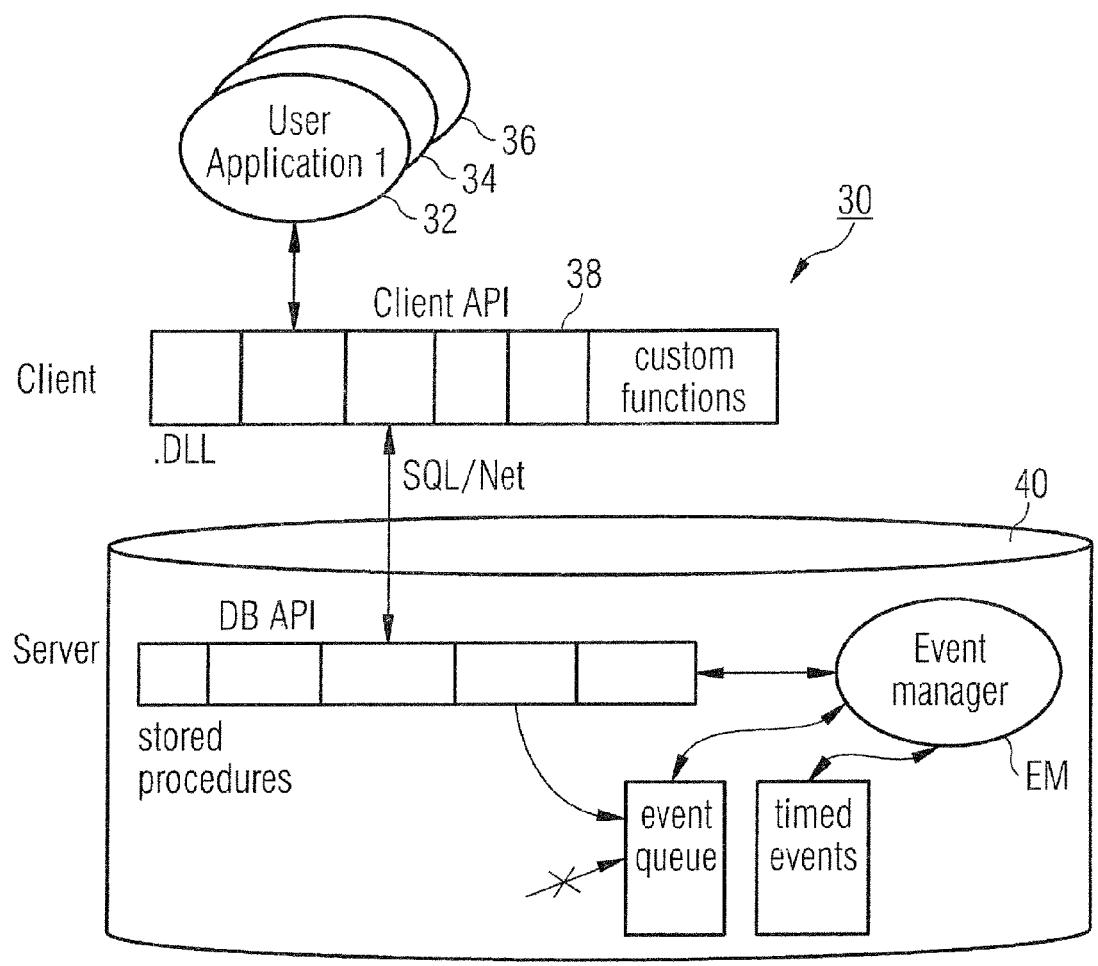
FIG. 4 is an illustration schematically representing structure of a system for managing the analysis results for samples handled in the medical diagnostic laboratory.

FIG. 4 schematically represents the structure of a system 30 for managing the analysis results for samples S handled in the medical diagnostic laboratory. The analysis process line is executed by the user applications 32, 34, 36 (which is the workflow execution software). These user applications 32, 34, 36 are connected via a client program interface 38 containing for example all the required .dll-files (dynamic link library-files). Via a network SQL/Net the client program interface couples to a server containing a database 40 for the application program interface 38. In the server environment, the event manager EM couples to the stored procedures and to the event queue and a list of timed events.

Figure 3:
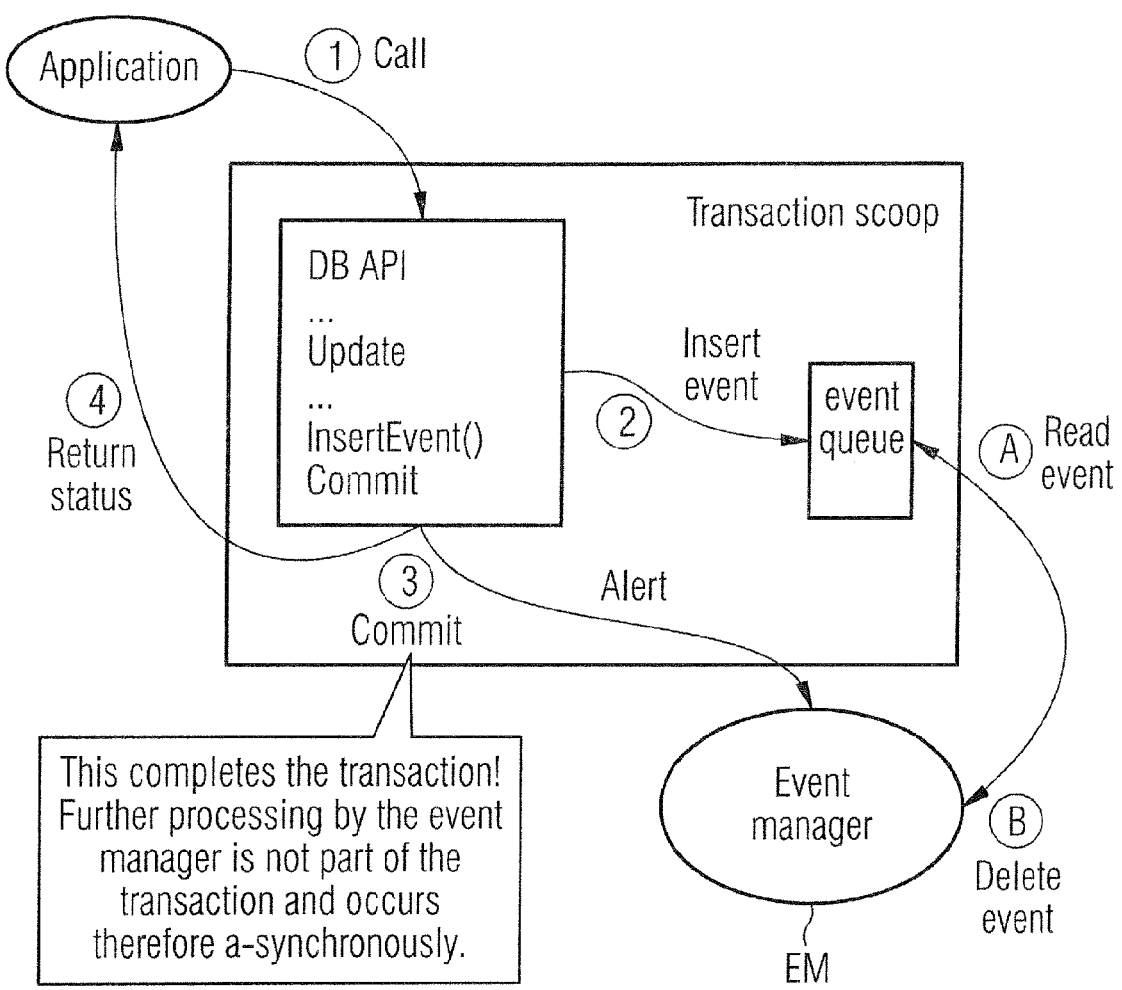
FIG. 3 is an illustration schematically representing the method involving an event manager into the productive process of the medical diagnostic laboratory of FIG. 1.

With the mechanism explained with respect to FIG. 3, the event manager EM is triggered by any new entry in the event queue and/or by timed events. Therefore, the event manager EM reacts to events that are sent when any modification is done to the sample S and/or the sample record SR by a user or any application handling the analysis process of the sample S. On every event, the event manager EM evaluates if a transition between the actual status ST and a new status ST has to be initiated according to the conditions set out by the set of rules defined by the user. When a transition takes place, the event manager EM executes any action A that have been configured by the user in order to customize the system.

It has to be pointed out that this event manager EM can not only work on samples S but for many other types of objects in the laboratory/production analysis system. For example, further possible objects are analysis results and sample info cards, i.e. for grouping administrative information of a sample S.

Therefore, the event manager EM enables the user to define its own projects with its workflow steps and the required life cycle without modifying the standard laboratory/production execution software. The event manager EM runs as a background process parallel to the laboratory/production execution software, the user is enabled to run continuously while the event manager EM is continuously working in background.

The invention claimed is:

1. A method for managing results of an analysis process on samples handled in a laboratory, the method which comprises the steps of:
    defining workflow steps to be performed in a laboratory including machines performing an analysis process on samples, and defining respective workflow executing software for implementing the workflow steps in the laboratory;
    generating for each of the samples, a sample record including results of the workflow steps as the samples are handled in the laboratory and a respective status;
    defining an event manager for managing a transition from an actual status to a new status in the sample record according to the results of the workflow steps, the event manager being individually programmable apart from the respective workflow executing software;
    defining for the event manager a customized number of statuses linked to the workflow steps and for each transition a customizable set of rules delivering check results; and
    executing in parallel the analysis process performed by the machines on the samples, the respective workflow execution software and the event manager, thereby assigning the respective status to the sample record depending on the check results derived from an execution of the customizable set of rules;
    wherein the customizable set of rules checks a content of the sample record against predefined thresholds; and
    wherein the step of checking the customizable set of rules against predefined thresholds further includes deciding whether an entry is present within a distinct record field of the sample record or not.

2. The method according to claim 1, wherein at least one of the workflow steps includes reanalyzing at least one of the samples based on an analysis parameter of the one of the samples.

3. The method according to claim 1, wherein the samples are human blood samples.

4. The method according to claim 1, wherein the analysis process includes measuring a quality of the results of the analysis process on the samples.

5. The method according to claim 1, wherein the customizable set of rules contains a number of activities which are executed in response to a delivered check results.

6. The method according to claim 5, which further comprises performing at least one of executing and controlling the activities by a separate processing line independent from the event manager and the respective workflow controlling software.

7. The method according to claim 1, which further comprises triggering an execution of the customizable set of rules by the event manager when any modification of one of the sample and the sample record occurs.

8. The method according to claim 7, which further comprises selecting the customizable set of rules in dependence on the actual status within the sample record.

9. The method according to claim 1, wherein the analysis process includes measuring a number of the samples handled in a unit of time by a particular one of the plurality of machines.

10. A system for managing results of an analysis process on samples handled in a laboratory, the system comprising:

means for defining workflow steps of to be performed in a laboratory including machines performing an analysis process on samples, and defining a respective workflow execution software for implementing the workflow steps in the laboratory;

means for generating for each of the samples, a sample record including results of the workflow steps as the samples are handled along the in the laboratory and a respective status;

means for defining an event manager for managing a transition from an actual status to a new status in the sample record according to the results of the workflow steps, said event manager being individually programmable apart from said respective workflow executing software;

said event manager containing a customized number of statuses linked to the workflow steps and containing for each said transition a customizable set of rules delivering check results; and means for executing in parallel the analysis process performed by the plurality of machines on the samples, the respective workflow execution software and the event manager, thereby assigning the respective status to the sample record depending on the check results derived from an execution of the customizable set of rules;

wherein said customizable set of rules checks a content of the sample record against predefined thresholds; and wherein checking the customizable set of rules against the predefined thresholds further includes deciding whether an entry is present within a distinct record field of the sample record or not.

11. The system according to claim 10, wherein said customizable set of rules has a number of activities executed in response to delivered check results.

12. The system according to claim 11, wherein said activities are at least one of executed and controlled by a separate processing line independent from said event manager and said respective workflow controlling software.

13. The system according to claim 10, wherein execution of said customizable set of rules by said event manager is triggered by any modification of one of the sample and the sample record.

14. The system according to claim 13, wherein said customizable set of rules is selected depending on the actual status within the sample record.

15. The system according to claim 10, wherein at least one of the workflow steps includes reanalyzing at least one of the samples based on an analysis parameter of the one of the samples.

* * * * *